United States Patent
Pedretti et al.

(10) Patent No.: US 11,931,686 B1
(45) Date of Patent: Mar. 19, 2024

(54) CARBON CAPTURE PROCESS UTILIZING INERT GAS MEDIUM TO ASSIST THERMAL DESORPTION

(71) Applicant: CARBON CAPTURE INC., Los Angeles, CA (US)

(72) Inventors: Andrea Pedretti, Pasadena, CA (US); Alex Welch, Los Angeles, CA (US); Saeb Besarati, Los Angeles, CA (US); Brian Holman, Los Angeles, CA (US)

(73) Assignee: CARBON CAPTURE INC., Los Angeles, CA (US)

( * ) Notice: Subject to any disclaimer, the term of this patent is extended or adjusted under 35 U.S.C. 154(b) by 0 days.

(21) Appl. No.: 18/469,354

(22) Filed: Sep. 18, 2023

Related U.S. Application Data

(60) Provisional application No. 63/375,929, filed on Sep. 16, 2022.

(51) Int. Cl.
*B01D 53/02* (2006.01)
*B01D 53/04* (2006.01)

(52) U.S. Cl.
CPC .... *B01D 53/0462* (2013.01); *B01D 2253/108* (2013.01); *B01D 2257/504* (2013.01); *B01D 2259/4009* (2013.01)

(58) Field of Classification Search
CPC .......... B01D 53/0462; B01D 2253/108; B01D 2257/504; B01D 2259/4009
See application file for complete search history.

(56) References Cited

U.S. PATENT DOCUMENTS

| | | | |
|---|---|---|---|
| 4,831,207 A | 5/1989 | O'Keefe et al. | |
| 5,686,630 A * | 11/1997 | Miao | C07C 51/48 549/274 |
| 7,517,389 B2 | 4/2009 | Van De Graaf et al. | |
| 10,619,108 B2 | 4/2020 | Yu et al. | |
| 10,821,394 B2 | 11/2020 | Doong | |
| 2006/0115421 A1* | 6/2006 | Leflaive | C07C 7/13 423/702 |
| 2013/0317261 A1* | 11/2013 | Sharma | C07C 29/76 568/917 |
| 2016/0346761 A1* | 12/2016 | Kanazirev | B01D 53/0462 |
| 2018/0001299 A1 | 1/2018 | Tan et al. | |
| 2018/0170840 A1* | 6/2018 | Bjorkman | C07C 15/073 |
| 2019/0185175 A1* | 6/2019 | Dardas | B01J 20/3425 |

OTHER PUBLICATIONS

International Search Report dated Dec. 19, 2023 issued in PCT Application No. PCT/US2023/074457.

* cited by examiner

*Primary Examiner* — Christopher P Jones
(74) *Attorney, Agent, or Firm* — RAPHAEL BELLUM PLLC

(57) ABSTRACT

The present invention uses an inert gas medium to heat an adsorbent bed and effect desorption of one or more chemical moieties adsorbed thereon. In particular, the invention is useful for the desorption of $CO_2$ from adsorption beds utilized for direct air capture (DAC) of $CO_2$ as well as adsorption beds utilized for capture of $CO_2$ from flue gases. The inert gas medium is heated to the necessary sorbent desorption temperature and passed through a $CO_2$ adsorbent bed to bring it up to the proper desorption temperature and effect desorption. Once the bed is fully desorbed, the $CO_2$-enriched gas medium is passed through one or more condensers to separate the inert gas medium from the $CO_2$ product.

20 Claims, 1 Drawing Sheet

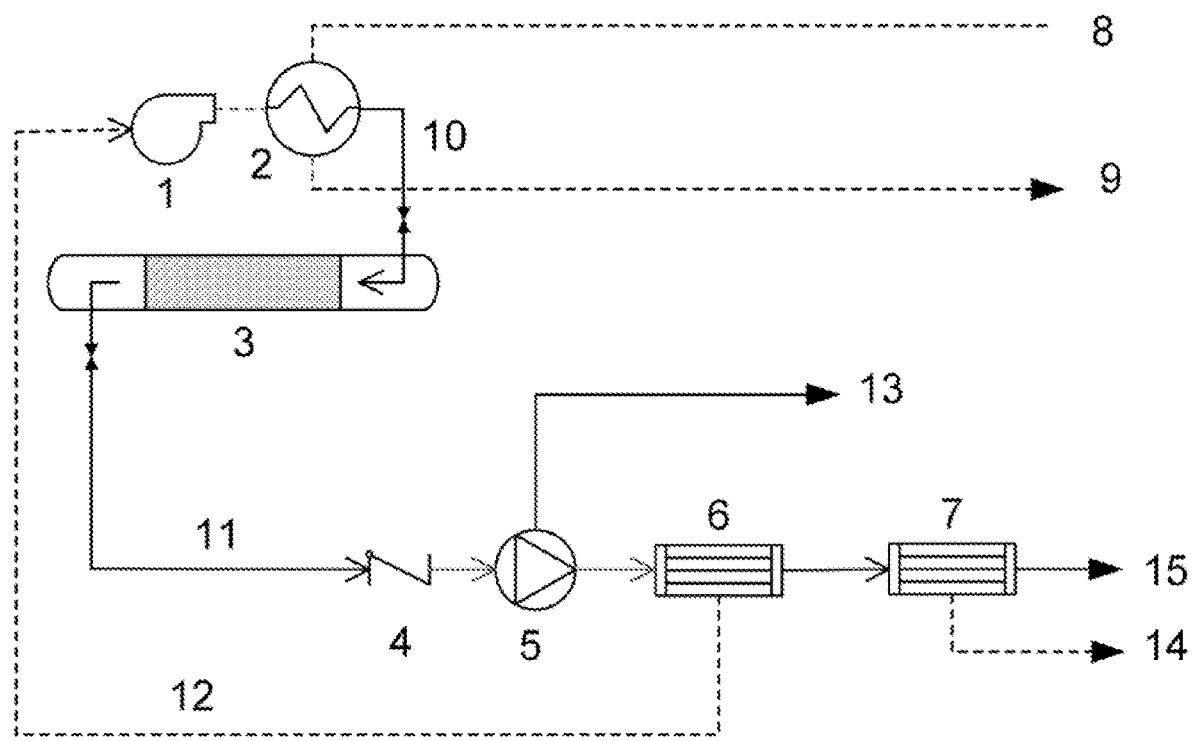

CARBON CAPTURE PROCESS UTILIZING INERT GAS MEDIUM TO ASSIST THERMAL DESORPTION

CROSS-REFERENCE TO RELATED APPLICATIONS

This application claims benefit of priority from U.S. Provisional Application No. 63/375,929 filed on Sep. 16, 2022, the entire contents of which are incorporated herein by reference.

TECHNICAL FIELD

The invention relates to methods for direct capture and separation of carbon dioxide ($CO_2$) from the atmosphere or $CO_2$ point sources such as flue gases. In some embodiments, an inert chemical fluid is vaporized and utilized to provide heat to an adsorbent bed to effect desorption of the adsorbed $CO_2$ from the adsorbent and then cooled to effect separation from the desorbed $CO_2$ gas. In some embodiments, the inert chemical fluid is also vaporized and utilized to act as a sweep gas to purge out the desorbed $CO_2$ and other desorbed chemical moieties that were originally adsorbed onto the adsorbed bed, e.g., water.

BACKGROUND

Global warming is posing devastating effects on our climate, health, and communities. Coastal flooding due to rising sea levels, extended wildfire seasons, as well as more destructive hurricanes are the direct impacts of climate change. Moreover, global food and water security are at stake. There is a consensus among scientists that global warming is directly linked to the increase in the level of greenhouse gases in the atmosphere. Carbon dioxide ($CO_2$) is a major greenhouse gas and its concentration in the atmosphere has sharply increased over the past century due to the burning of fossil fuels. Although efforts are underway to move toward renewable energy sources that do not emit greenhouse gases, shifting our energy supply to completely renewable sources is not possible in the near term and requires further technological advancements and significant global investments. Therefore, there is a growing need for technologies that can efficiently capture carbon dioxide from the flue gas of power plants and other industrial processes and, increasingly, even from ambient air. The latter is known as direct air capture (DAC).

$CO_2$ capture processes commonly utilize some type of regenerable adsorbent bed to capture the $CO_2$ from a gas or air stream (see, for example, Sanz-Pérez, et al., *Chemical Reviews*, 2016, 116, 11840-11876). A common approach basically involves a first step of moving ambient air or flue gas through a bed of a solid sorbent that is effective at selectively capturing a significant portion of the $CO_2$ contained therein. Once the sorbent reaches a level of significant saturation of $CO_2$, it needs to be regenerated in a second step. During regeneration, the adsorbent bed is treated with, for example, heat, vacuum, steam, or some combination thereof to cause the $CO_2$ to desorb from the sorbent. The released $CO_2$ is subsequently captured, and the regenerated sorbent can then be returned to the first step and reused to capture more $CO_2$. Due to the low concentrations (currently a little over 400 parts per million) of $CO_2$ in ambient air, high volumes of ambient air need to be moved and processed in a DAC process, requiring significant amounts of energy. Moreover, additional energy is required to regenerate the sorbent, so the system needs to be highly efficient.

Common solid $CO_2$ sorbents include various zeolites or molecular sieves; amine-functionalized silicious, inorganic, activated carbon, graphitic, metal organic framework (MOF) or polymeric supports; amine-functionalized carbon, glass, cellulosic, or polymeric fibers; and basic or weakly basic ion exchange resins (see, for example, Samanta, et al., *Industrial & Engineering Chemistry Research*, 2012, 51, 1438-1463). In some cases, the solid $CO_2$ sorbents are utilized in powder or pellet form in fluidized bed or packed bed configurations. In other cases, the solid $CO_2$ sorbents are utilized in fibrous webs, mats, or woven fabrics through which air is passed. In still other cases, the solid $CO_2$ sorbents are formed into structured monoliths or other structured forms such as sheets, films, membranes, or plates through or around which air may be passed.

The captured $CO_2$ is desorbed during the sorbent regeneration process which usually involves heating or applying heat and vacuum to the adsorbent bed. There is great interest in being able to heat the adsorbent beds quickly and efficiently to conserve energy and optimize cycle times. Direct heating with surface heaters or embedded heating elements is a common solution but suffers challenges to heat the sorbent in a fast, efficient, and/or uniform manner, especially with larger beds or insulative sorbent materials. Some systems, such as those described in U.S. Pat. No. 10,279,306 or by Li, et al., *ChemSusChem*, 2010, 3, 899-903, seek to heat adsorbents without external heaters and utilize heat from steam, flowing steam through the adsorbent bed to efficiently transfer heat to the adsorbent. The steam can also then be removed from the product stream by condensing it out. Steam-assisted desorption, however, is an undesirable option for many DAC processes due to a number of challenges, including, but not limited to the following: the strong interaction between water and typical $CO_2$ adsorbent bed component materials such as zeolites or functionalized siliceous supports, where excess energy is required to fully remove the strongly interacting water molecules, and hydrolysis, especially at the high temperatures required for desorption, is a problem for many adsorbent materials; competitive adsorption for certain sorbents may hurt the capacity and may cost energy to remove the water molecules; steam degradation, even for amines, when exposed to steam that is too hot for too long, usually resulting in degradation of the functional support which is usually alumina or silica; leaching or washcoat degradation if exposed to liquid water, or damage from expansion due to swelling; additional thermal energy costs not just for removing water, but also for heating up all of the high heat capacity liquid within a sorbent; corrosivity both in the reactor and in all downstream components that need to handle a steam/$CO_2$ mixture; and water loss, either due to incomplete condensation, or due to water being adsorbed from steam and then released to dry air desorption.

SUMMARY OF THE INVENTION

This invention provides an efficient way to heat the adsorbent bed, allowing for fast heat transfer, without or in conjunction with surface heaters or thermal jackets, while at the same time allowing for the product stream to remain pure. In contrast to the use of steam as a heat transfer medium, the chemical composition of the inert gas medium of the present invention is selected to be non-interactive with the component materials of the adsorbent bed. This system will use an inert chemical fluid that has a boiling point between 30-220° C. to heat a $CO_2$ adsorbent bed. The inert chemical fluid will be heated to the necessary sorbent desorption temperature (e.g., approximately 150-350° C. for a zeolite-based sorbent or approximately 40-120° C. for an amine-based sorbent), thus becoming an inert gas medium, and sent through the $CO_2$ adsorbent bed to bring the adsorbent up to the proper desorption temperature and to act as a sweep gas to purge the desorbed $CO_2$ and other desorbed chemical moieties that were originally adsorbed on the adsorbent bed, e.g., water. After exiting the adsorbent bed, the $CO_2$-laden inert gas medium can be directed through one or more condensers where the temperature is sufficiently lowered to cause the inert gas medium to become a liquid and thus easily separated from the $CO_2$ product. Other requirements on the inert chemical fluid are that it be non-toxic, not interact with the zeolite, $CO_2$ or water, have low vapor pressure under ambient conditions, and have a high thermal conductivity. Nonlimiting examples of suitable inert chemical fluids include m-xylene, o-xylene, ethyl benzoate, decamethyltetrasiloxane (MD2M), undecane, and mixtures thereof.

The invention relates to a method to regenerate an adsorbent bed containing one or more chemical moieties adsorbed onto the adsorbent bed, the method comprising:
a) vaporizing an inert chemical fluid to form an inert gas medium,
b) passing the inert gas medium through the adsorbent bed to sufficiently heat the adsorbent bed to effect thermal desorption of the one or more chemical moieties adsorbed onto the adsorbent bed and/or to act as a sweep gas to purge out the desorbed chemical moieties, to form an inert gas medium containing the one or more desorbed, gaseous chemical moieties,
c) passing the inert gas medium containing the one or more desorbed, gaseous chemical moieties through a condenser maintained at a temperature sufficient to condense the inert gas medium containing the one or more desorbed, gaseous chemical moieties, to form a condensed inert chemical fluid and the one or more desorbed, gaseous chemical moieties,
d) separating the condensed inert chemical fluid from the one or more desorbed, gaseous chemical moieties,
d) collecting or further processing the one or more desorbed, gaseous chemical moieties, and
e) returning the condensed inert chemical fluid for reuse in step a) above.

BRIEF DESCRIPTION OF THE DRAWINGS

These and other objects, features and attendant advantages of the present invention will be more fully appreciated or become better understood when considered in conjunction with the accompanying drawings, wherein:

FIG. 1 is a schematic illustration of a basic adsorption bed regeneration process utilizing an inert gas medium to heat and regenerate the $CO_2$ adsorption bed.

DETAILED DESCRIPTION OF THE INVENTION

The invention relates to a method to regenerate an adsorbent bed containing one or more chemical moieties adsorbed onto the adsorbent bed, the method comprising:
a) vaporizing an inert chemical fluid to form an inert gas medium,
b) passing the inert gas medium through the adsorbent bed to sufficiently heat the adsorbent bed to effect thermal desorption of the one or more chemical moieties adsorbed onto the adsorbent bed and/or to act as a sweep gas to purge out the desorbed chemical moieties, to form an inert gas medium containing the one or more desorbed, gaseous chemical moieties,
c) passing the inert gas medium containing the one or more desorbed, gaseous chemical moieties through a condenser maintained at a temperature sufficient to condense the inert gas medium containing the one or more desorbed, gaseous chemical moieties, to form a condensed inert chemical fluid and the one or more desorbed, gaseous chemical moieties,
d) separating the condensed inert chemical fluid from the one or more desorbed, gaseous chemical moieties,
d) collecting or further processing the one or more desorbed, gaseous chemical moieties, and
e) returning the condensed inert chemical fluid for reuse in step a) above.

The goal of the present invention is to efficiently heat a $CO_2$ adsorbent bed with an inert gas medium and then remove that gas from the product stream by condensing it. An inert chemical fluid is heated and vaporized to provide a hot inert gas medium. The inert gas medium is then utilized to provide heat to an adsorbent bed to effect desorption of the adsorbed $CO_2$ from the adsorbent and then cooled to effect separation from the desorbed $CO_2$ gas. In some embodiments, the inert gas medium is also utilized to act as a sweep gas to purge out the desorbed $CO_2$ and other desorbed chemical moieties that were originally adsorbed onto the adsorbent bed, e.g., water. Flowing a sweep gas through the bed serves to carry away the desorbed $CO_2$ and other desorbed chemical moieties and improves the overall efficiency of the desorption process. For example, a typical direct air capture (DAC) zeolite $CO_2$ adsorbent bed needs to be heated to temperatures greater than 150° C., and sometimes greater than 300° C., to desorb $CO_2$ and be regenerated ("the regeneration temperature") in a timely and efficient manner. In some embodiments of the invention, a DAC zeolite $CO_2$ absorbent bed may need to be heated to temperatures greater than 150° C., greater than 160° C., greater than 170° C., greater than 180° C., greater than 190° C., greater than 200° C., greater than 210° C., greater than 220° C., greater than 230° C., greater than 240° C., greater than 250° C., greater than 260° C., greater than 270° C., greater than 280° C., greater than 290° C., or greater than 300° C. to reach the regeneration temperature. In some embodiments of the invention, the regeneration temperature for such adsorbent beds is from about 250-300° C. More particularly, in some embodiments of the invention, the regeneration temperature for such adsorbent beds is about 300° C. For example, the regeneration temperature for such adsorbent beds is 290° C., 291° C., 292° C., 293° C., 294° C., 295° C., 296° C., 297° C., 298° C., 299° C., 300° C., 301° C., 302° C., 303° C., 304° C., 305° C., 306° C., 307° C., 308° C., 309° C., or 310° C. Other types of adsorbent beds comprising sorbents, such as polymeric or supported amines, may need to be heated to temperatures from about 40-120° C., or even somewhat higher, to desorb $CO_2$ and be regenerated. In some embodiments of the invention, the regeneration temperature for such adsorbent beds is from about 85-120° C. More particularly, in some embodiments of the invention the regeneration temperature for non-zeolite-based absorbent bed is about 85° C., 86° C., 87° C., 88° C., 89° C., 90° C., 91° C., 92° C., 93° C., 94° C., 95° C., 96° C., 97° C., 98° C., 99° C., 100° C., 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119°

C., or 120° C. In some preferred embodiments of the invention, the regeneration temperature for such adsorbent beds should be about 100° C.

Desirable chemicals to use as the inert chemical fluid are small molecules that are liquids under a range of ambient conditions (e.g., melting points below about 5° C.) but that would have a boiling point of at least about 10° C. or more below the target desorption temperature. In the operation of the invention, the inert chemical fluid is vaporized to form the inert gas medium. In some embodiments of the invention, the boiling point of the inert chemical fluid is at least about 11° C., 12° C., 13° C., 14° C., 15° C., 16° C., 17° C., 18° C., 19° C., 20° C., 21° C., 22° C., 23° C., 24° C., 25° C. or more below the target desorption temperature. In some preferred embodiments of the invention, the boiling point of the inert chemical fluid is at least about 25° C. or more below the target desorption temperature. In some embodiments of the invention, the boiling point of the inert chemical fluid is at least about 50° C. or more below the target desorption temperature. In some embodiments, the boiling point of the inert chemical fluid is at least about 100° C. or more below the target desorption temperature. In some embodiments, the boiling point of the inert chemical fluid is about 50° C. to 200° C. below the target desorption temperature. In some embodiments, the boiling point of the inert chemical fluid is about 75° C. to 175° C. below the target desorption temperature. As non-limiting examples: an inert chemical fluid with a boiling point greater than about 50° C., greater than about 90° C., or greater than about 120° C. might be utilized for amine type adsorbents; and an inert chemical fluid with a boiling point greater than about 135° C., greater than about 180° C., or greater than about 200° C. might be utilized for zeolite type adsorbents.

Other chemical and thermal properties of an inert chemical fluid used to form an inert gas media suitable for processes of the invention may be important. First, an inert gas medium of the invention may have a high thermal conductivity, so that heat can be transferred into and out of it easily, and a high heat capacity, so that temperature can be easily maintained. In one embodiment of the invention, the medium has a thermal conductivity that is at least about 50% of the thermal conductivity of water at the temperature of thermal desorption. In another embodiment of the invention, the medium has a heat capacity that is similar to or within 10-20% of the heat capacity of water. In yet another embodiment of the invention, the medium has a heat capacity that is greater than the heat capacity of water. It is also important that the vapor pressure in a process of the invention be low at ambient conditions so that, when the gaseous product is being separated from the condensed inert gas medium, a very minimal amount of that vapor ends up in the product stream. In one embodiment of the invention, the inert chemical fluid has a boiling point greater than 200° C., and the vapor pressure of the medium is less than about 25 mm Hg at ambient conditions. In another embodiment of the invention, the inert chemical fluid has a boiling point greater than 200° C., and the vapor pressure of the medium is less than the vapor pressure of water. In yet other embodiment of the invention, the inert chemical fluid with a boiling point greater than 200° C., and the vapor pressure of the medium is less than 5 mm Hg less than the vapor pressure of water or greater than 10 mm Hg less than the vapor pressure of water. In addition to having good process parameters, an inert chemical fluid of the invention should be non-polar so that it will be inert to typical adsorbents and should also be safe to handle and use. Therefore, the autoignition temperatures of the inert chemical fluids should be well over the target desorption temperature and will preferably be greater than about 350° C. In some embodiments of the invention, the autoignition temperature of the inert chemical fluid is at least 50° C. above the temperature of thermal desorption. For added fire safety, inert chemical fluids of the invention may have flash points significantly above the ambient temperature at the location of use. In some embodiments of the present invention, inert chemical fluids with flash points greater than 23° C. or greater than 38° C. are preferred. Inert chemical fluids of the invention should also be relatively non-toxic (such as, for example, LD50 greater than about 1,000 mg/kg) and non-hazardous. In some embodiments of the invention, the LD50 of the inert chemical fluid of the invention is about 1,000 mg/kg or more, 1,100 mg/kg or more, 1,200 mg/kg or more, 1,300 mg/kg or more, 1,400 mg/kg or more, 1,500 mg/kg or more, 1,600 mg/kg or more, 1,700 mg/kg or more, 1,800 mg/kg or more, 1,900 mg/kg or more, 2,000 mg/kg or more, 2,100 mg/kg or more, 2,200 mg/kg or more, 2,300 mg/kg or more, 2,400 mg/kg or more, 2,500 mg/kg or more, 2,600 mg/kg or more, 2,700 mg/kg or more, 2,800 mg/kg or more, 2,900 mg/kg or more, 3,000 mg/kg or more, 3,100 mg/kg or more, 3,200 mg/kg or more, 3,300 mg/kg or more, 3,400 mg/kg or more, 3,500 mg/kg or more, 3,600 mg/kg or more, 3,700 mg/kg or more, 3,800 mg/kg or more, 3,900 mg/kg or more, 4,000 mg/kg or more, 4,100 mg/kg or more, 4,200 mg/kg or more, 4,300 mg/kg or more, 4,400 mg/kg or more, 4,500 mg/kg or more, 4,600 mg/kg or more, 4,700 mg/kg or more, 4,800 mg/kg or more, 4,900 mg/kg or more, or 5,000 mg/kg or more. Nonlimiting examples of the inert chemical fluids include m-xylene, o-xylene, ethyl benzoate, decamethyltetrasiloxane (MD2M), and undecane. In some embodiments of the invention, the inert chemical fluid is m-xylene. In other embodiments of the invention, the inert chemical fluid is o-xylene. In other embodiments of the invention, the inert chemical fluid is ethyl benzoate. In other embodiments of the invention, the inert chemical fluid is decamethyltetrasiloxane (MD2M). In yet other embodiments of the invention, the inert chemical fluid is undecane. In some embodiments of the invention, the inert chemical fluid may be a mixture of any two or more of m-xylene, o-xylene, ethyl benzoate, decamethyltetrasiloxane (MD2M), and undecane. Tables 1 and 2 below list the general properties and thermal properties of nonlimiting examples of these chemicals that would be suitable for use in the present invention.

TABLE 1

Examples of Inert Chemical Fluids Suitable for Use as the Inert Gas Medium

| Chemical Name | m-Xylene | Ethyl Benzoate | o-Xylene | MD2M | Un-decane |
|---|---|---|---|---|---|
| Formula | $C_8H_{10}$ | $C_9H_{10}O_2$ | $C_8H_{10}$ | $C_{10}H_{30}Si_4O_3$ | $C_{11}H_{24}$ |
| Boiling point (° C.) | 139 | 213 | 144 | 194 | 195 |
| Melting point (° C.) | −48 | −34 | −25 | −76 | −26 |
| Flash point (° C.) | 27 | 88 | 32 | 63 | 62 |
| Autoignition Temperature (° C.) | 527 | 490 | 463 | 430 | 383 |
| Molecular weight (g/mol) | 106.16 | 150.17 | 106.16 | 384.84 | 156.31 |
| Density (g/cm³) | 0.86 | 1.05 | 0.879 | 0.875 | 0.74 |
| Molecule size approximation | 3.66 | 3.84 | 3.63 | 5.59 | 4.38 |

TABLE 1-continued

Examples of Inert Chemical Fluids Suitable for Use as the Inert Gas Medium

| Chemical Name | m-Xylene | Ethyl Benzoate | o-Xylene | MD2M | Un-decane |
|---|---|---|---|---|---|
| LD50 (Rat) (mg/kg) | 5,000 | 2,100 | 3,600 | >2,000 | 2,000 |
| MIR | 6.5 | | 8.2 | | 0.42 |
| Standard enthalpy change of vaporization (kJ/mol) | 35.7 | 61.1 | 36.2 | 50.2 | 56.4 |
| Concentration from vapor pressure (ppm) | 7,895 | 355 | 6,842 | 487 | 487 |
| Solubility in Water (g/100 g) | insoluble | 0.07 | 0.02 | insoluble | insoluble |

TABLE 2

Thermal Properties of Inert Chemical Fluids Compared to Water

| Chemical Name | Vapor Pressure @ 20° C. (mm Hg) | Heat Capacity @ 300° C. (Cp) J/g · K | Heat Capacity @ 20° C. (Cp) J/g · K | Thermal Conductivity @ 20° C. (mW/m · K) | Thermal Conductivity @ 300° C. (mW/m · K) |
|---|---|---|---|---|---|
| Water | 17.5 | 2.00 | 1.86 | 598 | 43.5 |
| m-Xylene | 6.0 | 2.12 | 1.69 | 131.3 | 39.5 |
| Ethyl Benzoate | 0.3 | — | 1.64 | — | — |
| o-Xylene | 5.2 | 2.18 | 1.76 | 135.7 | 39.1 |
| MD2M | 0.4 | 1.99 | 1.71 | 110.2 | 28.5 |
| Undecane | 0.4 | 2.80 | 2.19 | 134.5 | 34.5 |

In some embodiments of the present invention, it may be convenient to utilize alcohols as the inert chemical fluids. A wide variety of alcohols are commercially available that cover a wide range of boiling points. Alcohols also generally have low toxicities and are less corrosive than water or steam. Some nonlimiting examples of alcohols that may be utilized as inert chemical fluids in the present invention are listed in Table 3. Some alcohols form azeotropes with water. In some embodiments of the present invention, an alcohol/water azeotropic mixture may be used as the inert chemical fluid. In some embodiments of the present invention, an alcohol may form an azeotropic mixture with moisture present in and desorbed from the sorbent. In some embodiments of the present invention, alcohol azeotropic mixtures that are formed during the desorption process are separated from desorbed $CO_2$ by condensation and then further processed to separate the water from the alcohol before the alcohol is returned to the system.

TABLE 3

Examples of Alcohols Suitable for Use as the Inert Chemical Fluids

| Chemical Name | Melting point (° C.) | Boiling point (° C.) | Flash point (° C.) | Autoignition Temperature (° C.) | LD50 (Rat) (mg/kg) |
|---|---|---|---|---|---|
| Methanol | −98 | 65 | 11 | 470 | 5,628 |
| Ethanol | −114 | 78 | 14 | 365 | 7,340 |
| t-Butanol | 25 | 82 | 11 | 480 | 3,500 |
| 2-Propanol | −89 | 83 | 12 | 399 | 3,600 |
| 1-Propanol | −126 | 97 | 22 | 371 | 1,870 |
| 2-Butanol | −115 | 99 | 22 | 405 | 2,193 |
| t-Amyl Alcohol | −9 | 101 | 19 | 437 | 1,000 |
| i-Butanol | −108 | 108 | 28 | 415 | 2,460 |
| 1-Butanol | −90 | 118 | 35 | 343 | 790 |
| i-Amyl Alcohol | −117 | 131 | 43 | 340 | 1,300 |
| 2-Ethylbutanol | −114 | 145-151 | 58 | 315 | 1,850 |
| 2-Ethylhexanol | −76 | 180-186 | 81 | 290 | 3,730 |

In some embodiments of the present invention, it may be convenient to utilize hydrocarbon solvents as the inert chemical fluids. A wide variety of hydrocarbons, including pure individual hydrocarbons (e.g., heptane, octane, isooctane, etc.) and hydrocarbon mixtures or distillation cuts (e.g., petroleum ethers, mineral spirits, white spirits, ligroin, naphthas, isoparaffins, etc.) are commercially available that cover a wide range of boiling points. Hydrocarbons have relatively low toxicities and low corrosivity. In some embodiments of the present invention, the hydrocarbons are saturated, unsaturated or aromatic hydrocarbons. In some embodiments of the present invention, the hydrocarbons are saturated or aromatic hydrocarbons. In some embodiments of the present invention, the hydrocarbons are saturated hydrocarbons. In some embodiments of the present invention, the hydrocarbons are aromatic hydrocarbons. Some nonlimiting examples of hydrocarbons that may be utilized in the present invention are listed in Table 4. Hydrocarbons are generally immiscible with water and can generally be easily separated from water. In some embodiments of the present invention, the hydrocarbon inert chemical fluid will have a significantly different boiling point than water and can be separated from water by selective condensation through a series of condensers at different temperatures. In some embodiments of the present invention, the amounts of water present in the condensed hydrocarbon fluid will be relatively low and can be removed by passing the hydrocarbon fluid through a desiccant bed. In some embodiments of the present invention, the hydrocarbon fluid and water will co-condense and will need to be physically separated.

TABLE 4

Examples of Hydrocarbons Suitable for Use as the Inert Chemical Fluids

| Chemical Name | Melting point (° C.) | Boiling point (° C.) | Flash point (° C.) | Autoignition Temperature (° C.) | LD50 (Rat) (mg/kg) |
|---|---|---|---|---|---|
| Heptane | −90 | 98 | −4 | 223 | >5,000 |
| Octane | −57 | 125 | 13 | 220 | >5,000 |
| Chlorobenzene | −45 | 132 | 24 | 590 | >2,000 |
| p-Cymene | −68 | 177 | 47 | 436 | 4,750 |
| Tetralin | −36 | 206 | 77 | 385 | 2,860 |

The inert gas medium is removed from the product stream in a process of the invention by condensing it. In some embodiments of the invention, the temperature for condensation is at least 5-10° C. lower than the boiling point of the inert chemical fluid used as the inert gas medium. In other embodiments of the invention, the temperature for condensation is at least 10-25° C. lower than the boiling point of the inert chemical fluid. In some embodiments of the invention, the temperature for condensation is at least 25° C. lower than the boiling point of the inert chemical fluid. In some embodiments of the invention, the temperature for condensation is lower than the boiling point of the inert chemical fluid but higher than 100° C., the boiling point of water. In some embodiments of the invention, the temperature for condensation is about 20° C.

An example of a basic system according to the invention to use the inert gas medium to desorb a $CO_2$ adsorbent bed is shown in FIG. 1. After the adsorbent becomes saturated with adsorbed $CO_2$, residual air is removed from adsorbent bed (3) via use of a vacuum pump (5) and vented back to the atmosphere (evacuated air, 13). Once sufficiently evacuated, the vacuum is stopped, and the inert chemical fluid (12) is sent through a pump (1) to a heat exchanger (2) to heat up the fluid to a temperature sufficient to vaporize the inert chemical fluid to form the inert gas medium (10). Line (8) is the inlet for the high temperature fluid (HTF) and (9) is the return for the HTF line feeding heat exchanger (2). In some embodiments of the invention, selection of the HTF may be matched to the targeted desorption temperature to which the inert gas medium is heated. In some embodiments of the invention, for lower temperatures, the HTF may be water, steam, glycols, or polyglycols. In some embodiments of the invention, for higher temperatures, the HTF may be a synthetic fluid, including but not limited to, silicone oils and aromatic oils. Some examples of common heat transfer fluids include, but are not limited to, Dowtherm™ (Dow), Dynalene, Paratherm, and Therminol® (Eastman) heat transfer fluids. After vaporization, the inert gas medium (10) is passed through the $CO_2$ adsorbent bed (3) to increase the temperature of said adsorbent bed. The bed then desorbs the adsorbed $CO_2$ because of the increased temperature and low partial pressure of the $CO_2$. The inert gas medium enriched in $CO_2$ (11) then exits the bed and passes through a check valve (4) and on to the condenser (6). At the condenser (6), the inert chemical fluid (12) is condensed and recirculated back to pump (1), and the $CO_2$, plus any other gases desorbed from the bed, continues to a second condenser (7). There, any water (14) is condensed out of the $CO_2$ product stream leaving a purified $CO_2$ product stream (15). In general, the purified $CO_2$ product stream will have a purity of greater than about 90%.

In some embodiments of the invention, the heated inert gas medium will be utilized as the only method of heating the adsorbent bed (3). In other embodiments, one or more external heaters may be utilized around the adsorbent bed (3), and optionally around the process lines feeding into and/or out of said adsorbent bed, to provide additional heat to, as an example, help maintain a desired minimum temperature within the system or to offset parasitic heat loss within the system.

In some embodiments of the invention, one or more zeolites are used as the adsorbent in the adsorbent bed. Low-silica zeolites with the faujasite (FAU) framework topology are commercially available at a relatively low cost (e.g., 13X and Y) and are amongst the most commonly used adsorbents in industrial gas adsorption and separation processes. Thus, in some embodiments of the invention, the adsorbent in the adsorbent bed is a 13X zeolite. In other embodiments of the invention, the adsorbent in the adsorbent bed is an erionite zeolite, a chabazite zeolite, a mordenite zeolite, a clinoptilolite zeolite, a 4A zeolite, or a 5A zeolite. In yet other embodiments of the invention, the adsorbent bed may contain two or more adsorbents selected from a 13X zeolite, an erionite zeolite, a chabazite zeolite, a mordenite zeolite, a clinoptilolite zeolite, a 4A zeolite, and a 5A zeolite. In some embodiments of the present invention, one or more amine functionalized solid sorbents are used as the adsorbent in the adsorbent bed, including (i) polyamines supported on inorganic oxides; (ii) polyamines supported on other materials; and (iii) polyamine adsorbents that do not feature a support material. See the variety of solid amine-based sorbents is described in Hamdy, et al., *Materials Advances*, 2021, 2, 5843-5880, the disclosure of which is incorporated herein by reference. In some embodiments of the present invention, the polyamines may be selected from one or more of the group consisting of linear or branched polyethyleneimine (PEI), polypropyleneimine (PPI), polyallylamine, and polyvinylamine. In some embodiments of the present invention, the polyamines may comprise one or more amine-functionalized weakly basic anion exchange resins such as, but not limited to, Lewatit® VP OC 1065 resin (Lanxess) or Purolite® A110 resin (Ecolab).

In some embodiments of the invention, the adsorbents will be in a particulate form or may be formed into a bead or pellet form which may be utilized in a packed bed configuration. Pressurized air may be passed through the bed during the adsorption stage and the inert gas medium may be passed through the bed during the desorption stage. In some embodiments of the invention, the adsorbents will be coated onto a monolithic support, often in the form of a honeycomb structure with long open channels where air or the inert gas medium may flow through the open channels. In some embodiments of the invention, the adsorbents will be coated onto a two-dimensional support structure, such as a fabric, membrane, web, etc., to form adsorbent sheet materials. The adsorbent sheet materials may be fabricated into filter elements wherein air or the inert gas medium passes through the sheets or may be contained within a contactor structure wherein the sheets are supported in a parallel arrangement and air or the inert gas medium may flow through the gaps between the parallel sheets.

The adsorbents are selected due to their high affinity for $CO_2$, although they may also adsorb chemical moieties other than $CO_2$. For example, zeolite adsorbents will typically adsorb chemical moieties such as water and nitrogen along with $CO_2$ under direct air capture conditions. Sorbents useful for the invention will typically adsorb chemical moieties such as a variety of "acid gases" other than $CO_2$, including hydrogen sulfide and hydrogen halides which may be especially prevalent, for example, in flue gases.

As those skilled in the art will appreciate, numerous modifications and variations of the present invention are possible in light of these teachings, and all such are contemplated hereby. All of the references cited herein are incorporated by reference herein for all purposes, or at least for their teachings in the context presented.

Exemplary Embodiments of the Invention

E1. A method to regenerate an adsorbent bed containing one or more chemical moieties adsorbed onto the adsorbent bed, the method comprising:
  a) vaporizing an inert chemical fluid to form an inert gas medium,
  b) passing the inert gas medium through the adsorbent bed to sufficiently heat the adsorbent bed to effect thermal desorption of the one or more chemical moieties adsorbed onto the adsorbent bed and/or to act as a sweep gas to purge out the desorbed chemical moieties, to form an inert gas medium containing the one or more desorbed, gaseous chemical moieties,
  c) passing the inert gas medium containing the one or more desorbed, gaseous chemical moieties through a condenser maintained at a temperature sufficient to condense the inert gas medium containing the one or more desorbed, gaseous chemical moieties, to form a condensed inert chemical fluid and the one or more desorbed, gaseous chemical moieties, d) separating the condensed inert chemical fluid from the one or more desorbed, gaseous chemical moieties, d) collecting or further processing the one or more desorbed, gaseous chemical moieties, and e) returning the condensed inert chemical fluid for reuse in step a) above.

E2. The method of E1, wherein the adsorbent bed comprises a zeolite sorbent.

E3. The method of E2, wherein the zeolite sorbent is a 13X zeolite.

E4. The method of E2, wherein the zeolite sorbent is selected from the group consisting of erionites, chabazites, mordenites, clinoptilolites, 4A, and 5A.

E5. The method of any of E2-E4, wherein the adsorbent bed is heated to a temperature greater than 200° C.

E6. The method of E5, wherein the adsorbent bed is heated to a temperature greater than 300° C.

E7. The method of E1, wherein the adsorbent bed comprises polymeric or supported amine sorbents.

E8. The method of E7, wherein the adsorbent bed is heated to a temperature of about 40-120° C.

E9. The method of any of E1-E8, wherein the inert chemical fluid is selected from the group consisting of m-xylene, o-xylene, ethyl benzoate, decamethyltetrasiloxane (MD2M), and undecane.

E10. The method of any of E1-E9, wherein the inert chemical fluid has a melting point below about 5° C. and a boiling point at least 10° C. below the temperature of thermal desorption.

E11. The method of E10, wherein the inert chemical fluid has a boiling point between about 50-200° C. below the temperature of thermal desorption of the one or more chemical moieties adsorbed onto the adsorbent bed.

E12. The method of any of E1-E11, wherein the inert chemical fluid has a heat capacity that is greater than the heat capacity of water.

E13. The method of any of E1-E12, wherein the inert chemical fluid has a thermal conductivity that is at least about 50% of the thermal conductivity of water at the temperature of thermal desorption.

E14. The method of any of E1-E6 or E9-E13, wherein the inert chemical fluid has a vapor pressure that is less than the vapor pressure of water at ambient conditions when the inert chemical fluid has a boiling point greater than 200° C.

E15. The method of any of E1-E14, wherein the inert chemical fluid is non-polar.

E16. The method of any of E1-E15, wherein the inert chemical fluid has an autoignition temperature at least 50° C. above the temperature of thermal desorption.

E17. The method of any of E1-E16, wherein the inert chemical fluid has an LD50 greater than about 1,000 mg/kg.

E18. The method of any of E1-E17, wherein the temperature to condense the inert gas medium is at least 5-10° C. lower than the boiling point of the inert chemical fluid.

E19. The method of any of E1-E17, wherein the temperature to condense the inert gas medium is at least 25° C. lower than the boiling point of the inert chemical fluid.

E20. The method of any of E1-E17, wherein the temperature to condense the inert gas medium is lower than the boiling point of the inert chemical fluid but higher than 100° C.

E21. The method of any one of E1-E8 and E10-E20, wherein the inert chemical fluid is selected from the group consisting of 2-ethylhexanol, p-cymene, and tetralin.

E22. The method of any one of E1-E8 and E10-E20, wherein the inert chemical fluid is an alcohol.

E23. The method of any one of E1-E8 and E10-E20, wherein the inert chemical fluid is a hydrocarbon.

E24. The method of any one of E1-E23, wherein the inert chemical fluid has an autoignition temperature of at least 350° C.

What is claimed is:

1. A method to regenerate an adsorbent bed containing one or more chemical moieties adsorbed onto the adsorbent bed, the method comprising:
   a) vaporizing an inert chemical fluid to form an inert gas medium,
   b) passing the inert gas medium through the adsorbent bed to sufficiently heat the adsorbent bed to effect thermal desorption of the one or more chemical moieties adsorbed onto the adsorbent bed and/or to act as a sweep gas to purge out the desorbed chemical moieties, to form an inert gas medium containing the one or more desorbed, gaseous chemical moieties,
   c) passing the inert gas medium containing the one or more desorbed, gaseous chemical moieties through a condenser maintained at a temperature sufficient to condense the inert gas medium containing the one or more desorbed, gaseous chemical moieties, to form a condensed inert chemical fluid and the one or more desorbed, gaseous chemical moieties,
   d) separating the condensed inert chemical fluid from the one or more desorbed, gaseous chemical moieties,
   e) collecting or further processing the one or more desorbed, gaseous chemical moieties, and
   f) returning the condensed inert chemical fluid for reuse in step a) above.

2. The method of claim 1, wherein the adsorbent bed comprises a zeolite sorbent.

3. The method of claim 2, wherein the zeolite sorbent is a 13X zeolite.

4. The method of claim 2, wherein the zeolite sorbent is selected from the group consisting of erionites, chabazites, mordenites, clinoptilolites, 4A, and 5A.

5. The method of claim 2, wherein the adsorbent bed is heated to a temperature greater than 200° C.

6. The method of claim 5, wherein the adsorbent bed is heated to a temperature greater than 300° C.

7. The method of claim 1, wherein the adsorbent bed comprises polymeric or supported amine sorbents.

8. The method of claim 7, wherein the adsorbent bed is heated to a temperature of about 40-120° C.

9. The method of claim 1, wherein the inert chemical fluid is selected from the group consisting of m-xylene, o-xylene, ethyl benzoate, decamethyltetrasiloxane (MD2M), and undecane.

10. The method of claim 1, wherein the inert chemical fluid has a melting point below about 5° C. and a boiling point at least 10° C. below the temperature of thermal desorption.

11. The method of claim 10, wherein the inert chemical fluid has a boiling point between about below the temperature of thermal desorption of the one or more chemical moieties adsorbed onto the adsorbent bed.

12. The method of claim 1, wherein the inert chemical fluid has a heat capacity that is greater than the heat capacity of water.

13. The method of claim 1, wherein the inert chemical fluid has a thermal conductivity that is at least about 50% of the thermal conductivity of water at the temperature of thermal desorption.

14. The method of claim 1, wherein the inert chemical fluid has a vapor pressure that is less than the vapor pressure of water at ambient conditions when the inert chemical fluid has a boiling point greater than 200° C.

15. The method of claim 1, wherein the inert chemical fluid is non-polar.

16. The method of claim 1, wherein the inert chemical fluid has an autoignition temperature at least 50° C. above the temperature of thermal desorption.

17. The method of claim 1, wherein the inert chemical fluid has an LD50 greater than about 1,000 mg/kg.

18. The method of claim 1, wherein the inert chemical fluid is selected from the group consisting of 2-ethylhexanol, p-cymene, and tetralin.

19. The method of claim 1, wherein the inert chemical fluid is an alcohol.

20. The method of claim 1, wherein the inert chemical fluid is a hydrocarbon.

* * * * *